(12) United States Patent
Lev

(10) Patent No.: US 10,765,261 B1
(45) Date of Patent: Sep. 8, 2020

(54) ELECTRIC SKEWERS AND COOKING APPARATUSES

(71) Applicant: Brandon Eli Lev, Peoria, AZ (US)

(72) Inventor: Brandon Eli Lev, Peoria, AZ (US)

( * ) Notice: Subject to any disclaimer, the term of this patent is extended or adjusted under 35 U.S.C. 154(b) by 191 days.

(21) Appl. No.: 16/136,363

(22) Filed: Sep. 20, 2018

(51) Int. Cl.
*A47J 37/04* (2006.01)
*A47J 43/18* (2006.01)
*H05B 3/44* (2006.01)

(52) U.S. Cl.
CPC ............. *A47J 43/18* (2013.01); *A47J 37/041* (2013.01); *H05B 3/44* (2013.01)

(58) Field of Classification Search
None
See application file for complete search history.

(56) References Cited

U.S. PATENT DOCUMENTS

| | | | | |
|---|---|---|---|---|
| 3,939,761 A | * | 2/1976 | McGinty | A47J 37/041 99/421 H |
| 4,372,199 A | * | 2/1983 | Brown | A47J 37/043 403/334 |
| 4,896,253 A | * | 1/1990 | Southworth | A47J 37/041 362/109 |
| 5,193,443 A | * | 3/1993 | Carney | A47J 37/0694 211/125 |
| 5,575,196 A | * | 11/1996 | Masel | A47J 37/043 99/419 |
| 6,382,085 B1 | * | 5/2002 | Dotan | A47J 37/0623 99/331 |
| 6,509,549 B1 | * | 1/2003 | Chasen | A47J 37/041 219/386 |
| 8,915,180 B2 | * | 12/2014 | Jacob | A47J 37/041 99/450 |
| 2004/0055477 A1 | * | 3/2004 | Swank | A47J 37/042 99/419 |
| 2006/0033348 A1 | * | 2/2006 | Farid | A47J 43/28 294/61 |
| 2008/0066626 A1 | * | 3/2008 | Raichlen | A47J 37/0786 99/421 H |
| 2011/0283892 A1 | * | 11/2011 | Ikeda | A47J 37/0688 99/419 |
| 2014/0299002 A1 | * | 10/2014 | James | A47J 37/043 99/421 R |
| 2016/0338533 A1 | * | 11/2016 | Wangler | A47J 37/04 |

* cited by examiner

*Primary Examiner* — Ibrahime A Abraham
*Assistant Examiner* — Gyounghyun Bae
(74) *Attorney, Agent, or Firm* — Bruce A. Lev

(57) ABSTRACT

Electric skewers and cooking apparatuses that includes electrically heated skewers used to heat material from the inside out, and which can be used in combination with an electric cooking apparatus used to heat material from the outside in, to thereby heat material from the outside in and the inside out simultaneously.

27 Claims, 3 Drawing Sheets

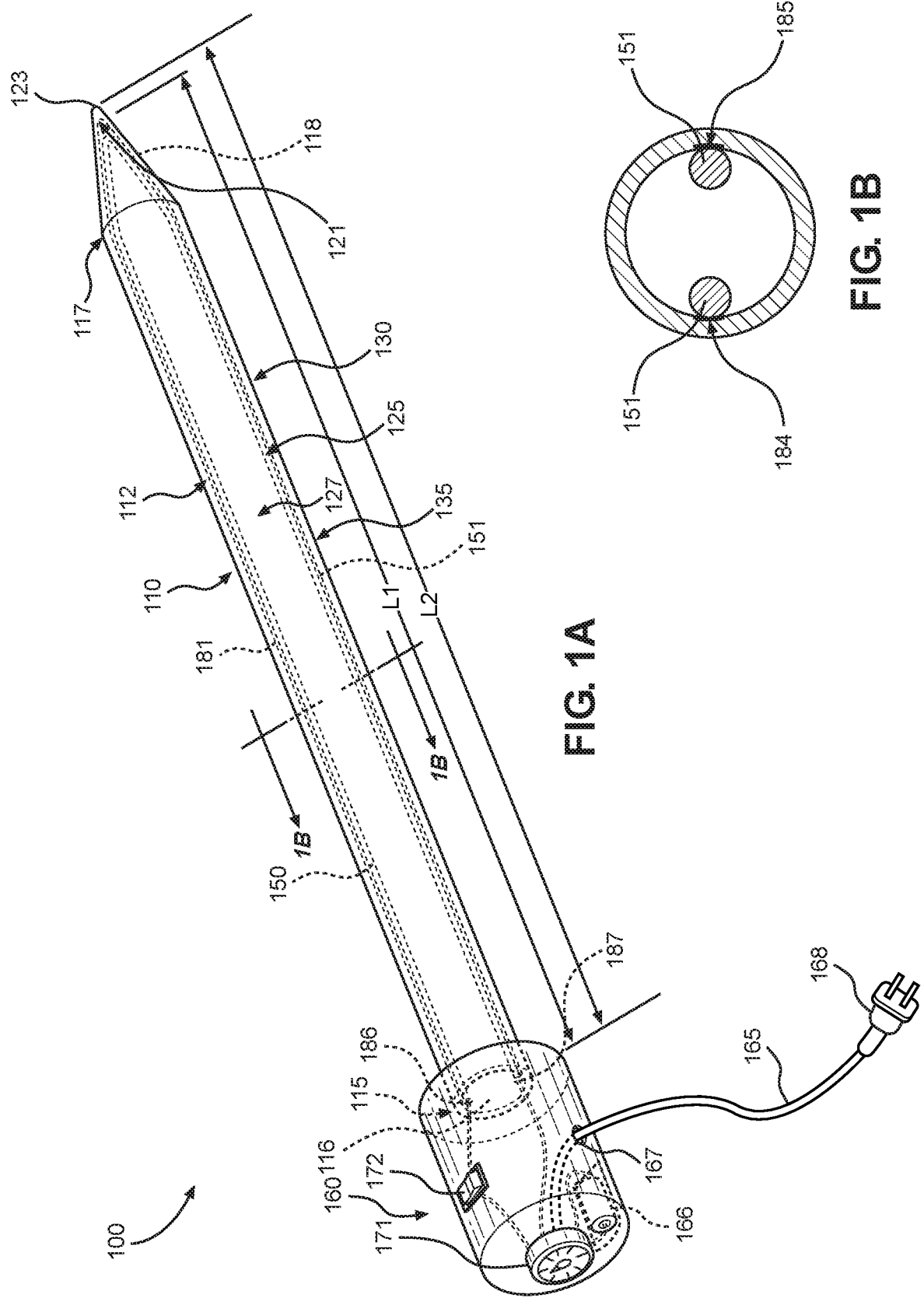

ELECTRIC SKEWERS AND COOKING APPARATUSES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of skewers and cooking apparatuses and the combination and use thereof to heat and cook food from the inside out and the outside in simultaneously.

2. Description of the Related Art

Skewers and cooking apparatuses in the past have consisted mainly of wooden or metallic rods adapted to either hold food in place or rotate food within a heating apparatus. Examples include shish kebobs and rotisserie chickens or roasts. The main problem of these previous apparatuses is that the inside of the food doesn't cook as fast as the outside if at all, therefore either an outer portion becomes burned by the time the inside reaches an appropriate temperature, or the inside never reaches the appropriate temperature when the outer portion has reached the appropriate temperature for a desired amount of time.

In the food industry, including private barbeques, the inside of food being cooked via a skewer must reach a certain temperature for a certain amount of time to properly kill germs and bacteria, and the like, that can sicken an individual after consumption. In reality, most people only cook skewered food until the outside looks cooked or appears burned. However, in many cases the inside of the food is not cooked properly when the outside looks cooked or appears burned, thereby possibly resulting in sickness and even death after consumption.

Therefore, it is extremely important to invent a way to avoid this problem. However, very few attempts have even been made. The closest attempt found, though not necessarily to kill germs and bacteria, is disclosed in a 1931 U.S. Pat. No. 1,890,907 to J. E. Hoover. This particular configuration incorporates a metallic skewer that is attached at an end portion thereof to a metal pan that is heated and (inactively) conducts heat therethrough. However, the main problem with this type of configuration is that the skewer does not heat up very much and does not become heated evenly throughout its length. As a result, the upper portion of the skewer furthest away from the heated pan (and heat source) hardly heats up if at all. In fact, it's impossible to heat its pan up enough to transfer enough energy to its skewer, throughout its length, to cook the inside of the food/roast being cooked without severely burning a portion of the food that is touching the pan. Further, since the temperature of the skewer is reduced along its length away from the pan, the food/roast would be heated unevenly. Therefore, this configuration is too inefficient and too ineffective to properly heat and cook the inside of the food/roast to kill all the germs and bacteria therein, let alone the food/roast will be cooked unevenly, which is undesirable. The instant invention overcomes all these deficiencies.

BRIEF SUMMARY OF THE INVENTION

In view of the foregoing disadvantages inherent in known skewers and cooking apparatuses, the present invention provides a novel electric skewer and cooking apparatus. The general purpose of the present invention, which will be described subsequently in greater detail is to provide an electrically heated skewer used to cook food from the inside out, and which can be used in combination with a cooking apparatus used to cook food from the outside in, to thereby cook material from the outside in and the inside out simultaneously.

In brief, the instant invention includes an electric skewer comprising an elongated heating rod; an elongated heating element; a handle; and an electrical power source, wherein the electric skewer is adapted to be pushed into food to be heated and heat the food from its inside outward while the food is being heated by a separate heat source from its outside inward, to thereby more efficiently heat the food throughout the food and to make sure that all portions of the food is heated to a desired temperature. Furthermore, the electric skewer can be used in combination with a cooking apparatus comprising a cooking platform; an electric heating element; an electrical power source; and at least one skewer power outlet, such that a plurality of electric skewers can be used at the same time and are adapted to be used to heat a plurality of foods at the same time within the interior volume of the main body of the cooking apparatus.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the electric skewer and cooking apparatus, constructed and operative according to the teachings of the present invention.

FIG. 1A shows a perspective view illustrating an electric skewer according to a first embodiment of the present invention.

FIG. 1B shows cross sectional view 1B-1B of the electric skewer according to the embodiment of FIG. 1A.

The various embodiments of the present invention will hereinafter be described in conjunction with the appended drawings, wherein like designations denote like elements.

DETAILED DESCRIPTION

Figures 2A, 2B:
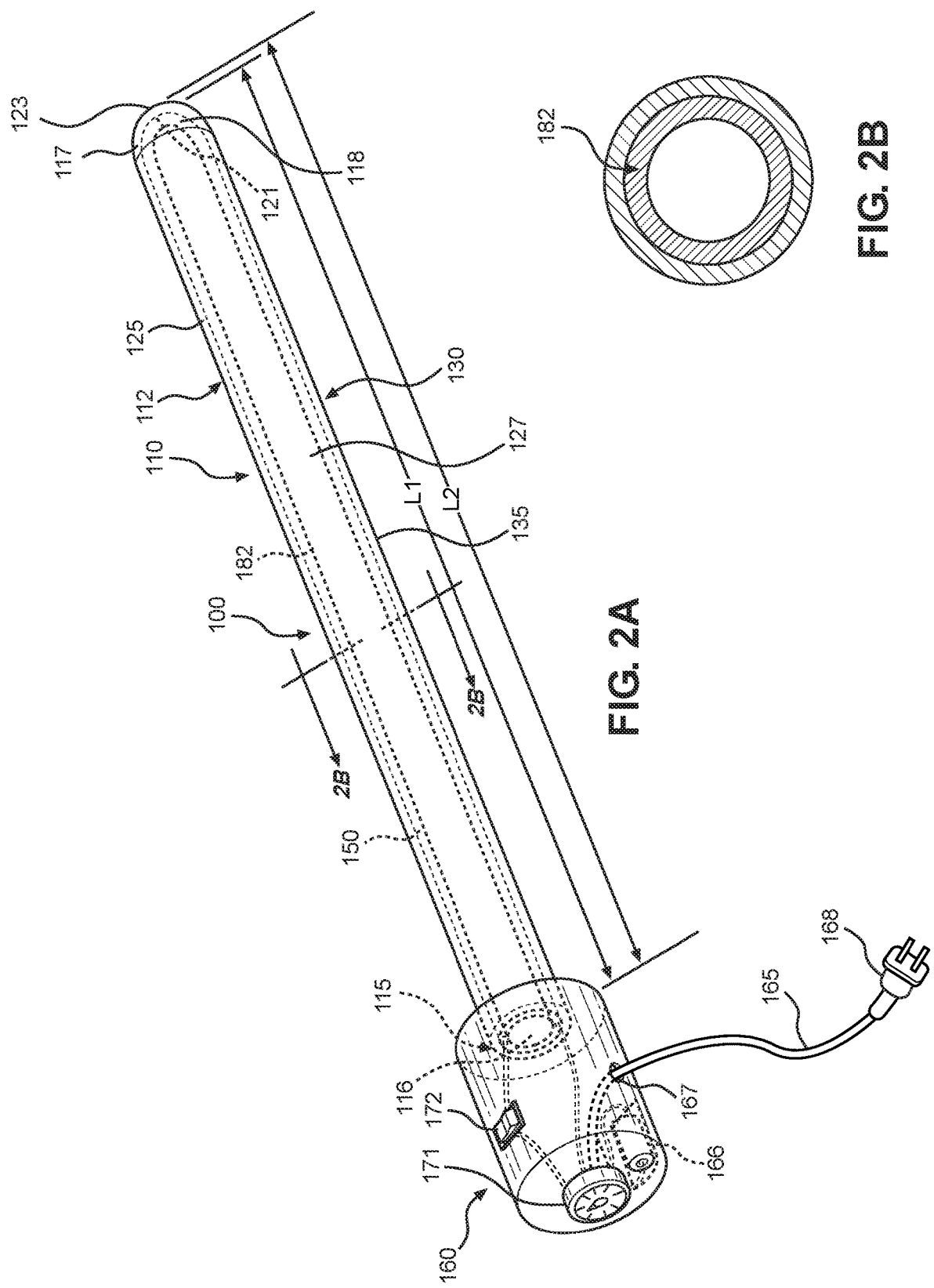
FIG. 2A shows a perspective view illustrating an electric skewer according to a second embodiment of the present invention.
FIG. 2B shows cross sectional view 2B-2B of the electric skewer according to the embodiment of FIG. 2A.

As discussed above, embodiments of the present invention relate to electrically heated skewers used to heat material from the inside out, and which can be used in combination with a cooking apparatus used to heat material from the outside in, to thereby heat material from the outside in and the inside out simultaneously.

Referring to FIG. 1A, the present invention is includes an electric skewer 100 comprising an elongated heating rod 110 having an elongated hollow body 112 with a proximal end 115 including an aperture 116 therethrough and a distal end 117 including a tip portion 118 formed having a pointed (or sharpened) shape and having an inner apex surface 121 and an outer apex surface 123, an interior wall 125 including an interior surface forming a hollow interior volume 127 between the proximal end and the inner apex surface of the tip portion of the distal end, an exterior wall 130 defining an exterior shape between the proximal end and the outer apex surface of the tip portion of the distal end, and forming an external heating surface 135 upon the entire exterior wall, a first length L1 along the interior wall between the proximal end and the inner apex surface of the tip portion of the distal end, a second length L2 between the proximal end and the outer apex surface of the tip portion of the distal end along the exterior wall; an elongated heating element 150 including an elongated conductor 151 located within the hollow interior volume of the elongated hollow body and contacts the interior wall of the elongated hollow body along the first length to thereby conduct heat evenly to the entire external heating surface of the exterior wall, wherein the elongated heating rod is adapted to be heated evenly along the second length L2, and wherein the elongated heating rod is adapted to be pushed into and pulled out from material to be heated; a handle 160 connected to the proximal end of the elongated hollow body of the elongated heating rod and is adapted to allow a person to hold the elongated heating rod while being pushed into and pulled out from the material to be heated, and wherein the handle is formed from a material adapted to resist heat from the elongated heating rod from transferring therethrough; and an electrical power source 165 electrically connected to and supplies electric power to the elongated conductor of the elongated heating element, wherein the heated skewer is adapted to be pushed into the material to be heated and heat the material from its inside outward while said material is being heated by a separate heat source from its outside inward, to thereby more efficiently heat the material throughout the material and to make sure that all portions of the material is heated to a desired temperature.

Referring to FIGS. 1A and 1B, the elongated conductor 151 may be formed as an electrical wire 181 extending along and contacting a first portion 184 of the interior surface of the interior wall along the first length between the proximal end and the inner apex surface of the tip portion of the distal end, and then continuing and extending along and contacting a second portion 185 of the interior surface of the interior wall spaced from the first portion and along the first length between the inner apex surface of the tip portion of the distal end and the proximal end, wherein the electrical wire 181 has a proximal end 186, a distal end 187, and a length therebetween and is adapted to heat up evenly along the entire length, and wherein the electrical wire 181 is adapted to conduct heat evenly to and along the entire second length L2 of the elongated hollow body and thereby the external heating surface of the exterior wall of the elongated heating rod. The electrical wire 181 can be formed from copper, aluminum, gold, platinum, silver, zinc, nickel, iron, steel, bronze, brass, and alloys and combinations thereof.

Referring to FIG. 2A, a second embodiment of the electric skewer 100 comprises an elongated heating rod 110 having an elongated hollow body 112 with a proximal end 115 including an aperture 116 therethrough and a distal end 117 includes tip portion 118 having a rounded (or curved) shape and having an inner apex surface 121 and an outer apex surface 123, an interior wall 125 including an interior surface forming a hollow interior volume 127 between the proximal end and the inner apex surface of the tip portion of the distal end, an exterior wall 130 defining an exterior shape between the proximal end and the outer apex surface of the tip portion of the distal end, and forming an external heating surface 135 upon the entire exterior wall, a first length L1 along the interior wall between the proximal end and the inner apex surface of the tip portion of the distal end, a second length L2 between the proximal end and the outer apex surface of the tip portion of the distal end along the exterior wall; an elongated heating element 150 including an elongated conductor located within the hollow interior volume of the elongated hollow body and contacts the interior wall of the elongated hollow body along the first length to thereby conduct heat evenly to the entire external heating surface of the exterior wall, wherein the elongated heating rod is adapted to be heated evenly along the second length L2, and wherein the elongated heating rod is adapted to be pushed into and pulled out from material to be heated; a handle 160 connected to the proximal end of the elongated hollow body of the elongated heating rod and is adapted to allow a person to hold the elongated heating rod while being pushed into and pulled out from the material to be heated, and wherein the handle is formed from a material adapted to resist heat from the elongated heating rod from transferring therethrough; and an electrical power source 165 electrically connected to and supplies electric power to the elongated conductor of the elongated heating element, wherein the heated skewer is adapted to be pushed into the material to be heated and heat the material from its inside outward while said material is being heated by a separate heat source from its outside inward, to thereby more efficiently heat the material throughout the material and to make sure that all portions of the material is heated to a desired temperature.

Referring to FIGS. 2A and 2B, the elongated conductor of the elongated heating element 150 may be formed as an electrical conducting tube 182 located within the hollow interior volume of the elongated hollow body and contact the entire interior surface of the interior wall and be adapted to conduct heat evenly to the entire external heating surface of said exterior wall. The electrical conducting tube 180 can be formed from copper, aluminum, gold, platinum, silver, zinc, nickel, iron, steel, bronze, brass, and alloys and combinations thereof. The electrical conducting tube 180 may also be formed to include a mesh material adapted to transfer and distribute heat throughout its volume more evenly and efficiently. As such, the conducting tube and the mesh material may be formed from different materials depending on the characteristics required of the electrical skewer.

The elongated hollow body 112 may be formed from metal or ceramic or other like conducting materials, such as copper, aluminum, gold, platinum, silver, zinc, nickel, iron, steel, bronze, brass, and alloys and combinations thereof depending on the characteristics required of the electrical skewer. The tip portion 118 of the distal end may be formed having a cone-shape or a curved cross-section adapted to pierce the material to be heated.

The power source 165 may include an elongated electric cord 168 adapted to releasably plug into an external power source. The electrical power source 165 may also include a rechargeable battery member 166.

The handle 160 can be formed having an aperture 167 therethrough adapted to allow the electric cord to pass therethrough and between the external power source and the elongated conductor of the elongated heating element. The handle 160 can be formed from an insulating material adapted to resist the transfer of heat from the elongated heating rod to the handle. The handle 160 may further include a power controller 171 and an on/off switch 172 attached thereto and electrically connected between the power source and the elongated conductor and adapted to control the amount of power delivered to the elongated conductor and thereby the temperature of the elongated conductor.

Figures 3, 4:
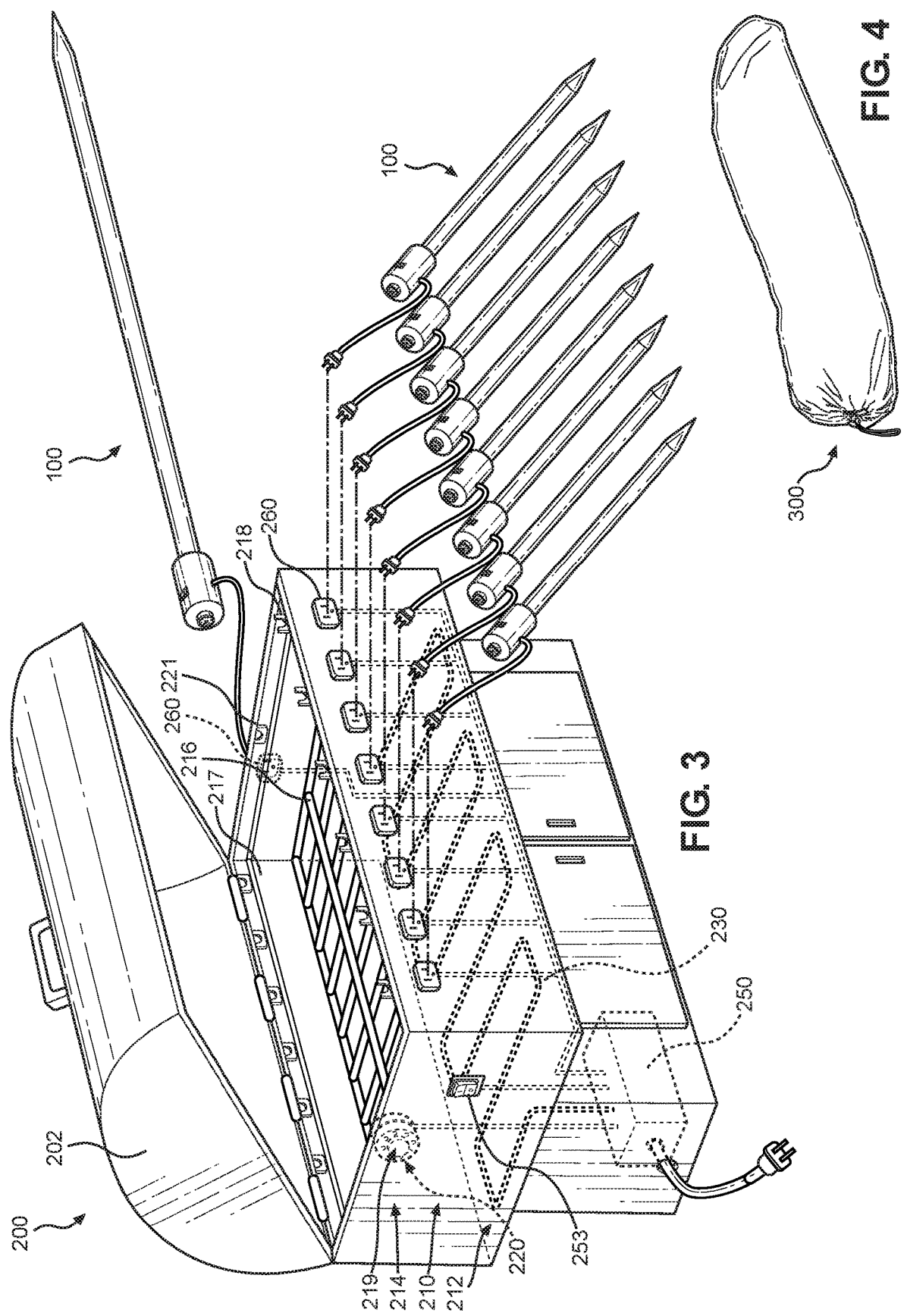
FIG. 3 is a perspective view illustrating a combination of a plurality of electric skewers of the present invention in combination with an electric cooking apparatus.
FIG. 4 is a perspective view illustrating a cover for at least one electric skewer of the present invention.

Referring to FIG. 3, the electric skewer 100 described above can also be used in combination with a cooking apparatus 200 comprising a main body 210 including a bottom wall 212, at least one side wall 214 attached to and extends from the bottom wall and defines an interior volume; a cooking platform 216, that may be formed as a grating, releasably connected to the at least one side wall within the interior volume and is adapted to hold material thereon to be heated by the cooking apparatus. Cooking apparatus 200 can include skewer holding members 217 and 218 and rotating skewer holder 219 incorporating motor member 220 and rotating skewer holder 221; an electric heating element 230 located within the interior volume and between the bottom wall and the cooking platform and may include electric heating coils, wherein the electric heating element 230 is adapted to heat the material placed upon the cooking platform 216 and the material on any one of the electric skewers 100; an electrical power source 250 electrically connected to and supplies electric power to the electric heating element 230 electrically connected to an on/off switch 253; and at least one skewer power outlet 260 connected to the at least one side wall of the main body, is electrically connected to the electrical power source, and is adapted to supply power to at least one electric skewer. The cooking apparatus 200 may further include a cover member 202 adapted to releasably cover the main body and releasably enclose the interior volume of the main body when heating the material.

When the electric skewer 100 is used in combination with a cooking apparatus 200, the electric skewer may include the electrical power cord 168 adapted to releasably connect with and transfer electric power from the at least one skewer power outlet 260 of the cooking apparatus and supply electric power to the elongated conductor of the elongated heating element. As such, the electric skewer is adapted to be pushed into material, such as food, to be heated and heat the material from its inside outward while the material is being heated by the cooking apparatus from its outside inward, to thereby more efficiently heat the material throughout the material and to make sure that all portions of the material is heated to a desired temperature. The combination of the electric skewer 100 and the cooking apparatus 200 can be formed wherein the cooking apparatus includes a plurality of skewer power outlets 260 spaced from one another and connected to the at least one side wall of the main body, are respectively electrically connected to the electrical power source 250, and are adapted to supply power to a plurality of electric skewers 100; and wherein there are a plurality of electric skewers 100 each adapted to releasably connect with a respective one of the plurality of skewer power outlets 260, such that the plurality of electric skewers can be used at the same time and are adapted to be used to heat a plurality of materials, such as foods, at the same time within the interior volume of the main body of the cooking apparatus.

Referring to FIG. 4, a protective cover 300 can also be included with each electric skewer, or adapted to hold a plurality of electric skewers therein, and be formed from an insulating material adapted to resist the transfer of heat from the electric skewer through the protective cover to thereby protect a person when handling the electric skewer after use and/or for protecting the skewer when in storage.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:
1. An electric skewer comprising:
   an elongated heating rod including:
      an elongated hollow body including:
         a proximal end including an aperture therethrough;
         a distal end including:
            a tip portion including:
               an inner apex surface; and
               an outer apex surface;
         an interior wall including an interior surface forming a hollow interior volume between said proximal end and said inner apex surface of said tip portion of said distal end;
         an exterior wall defining an exterior shape between said proximal end and said outer apex surface of said tip portion of said distal end, and forming an external heating surface upon the entire of said exterior wall;
         a first length along said interior wall between said proximal end and said inner apex surface of said tip portion of said distal end;
         a second length between said proximal end and said outer apex surface of said tip portion of said distal end along said exterior wall;
      an elongated heating element including:
         an elongated conductor;
            wherein said elongated conductor is located within said hollow interior volume of said elongated hollow body and contacts said interior wall of said elongated hollow body along said first length to thereby conduct heat evenly to the entire of said external heating surface of said exterior wall;
wherein said elongated heating rod is adapted to be heated evenly along said second length; and
wherein said elongated heating rod is adapted to be pushed into and pulled out from material to be heated;
a handle;
wherein said handle is connected to said proximal end of said elongated hollow body of said elongated heating rod, and is adapted to allow a person to hold said elongated heating rod while being pushed into and pulled out from said material to be heated; and
wherein said handle is formed from a material adapted to resist said heat from said elongated heating rod from transferring therethrough; and
an electrical power source;
wherein said electrical power source is electrically connected to and supplies electric power to said elongated conductor of said elongated heating element;
wherein said electric skewer is adapted to be pushed into said material to be heated and heat said material from its inside outward while said material is being heated by a separate heat source from its outside inward, to thereby more efficiently heat said material throughout said material and to make sure that all portions of said material is heated to a desired temperature.

2. The electric skewer of claim 1, wherein said elongated conductor is formed as an electrical conducting tube located within said hollow interior volume of said elongated hollow body and contact the entire of said interior surface of said interior wall, and adapted to conduct said heat evenly to the entire said external heating surface of said exterior wall.

3. The electric skewer of claim 2, wherein said electrical conducting tube is formed from a material chosen from a list of materials consisting of copper, aluminum, gold, platinum, silver, zinc, nickel, iron, steel, bronze, and brass.

4. The electric skewer of claim 1, wherein said elongated conductor is formed as an electrical wire extending along and contacting a first portion of said interior surface of said interior wall along said first length between said proximal end and said inner apex surface of said tip portion of said distal end, and then continuing and extending along and contacting a second portion of said interior surface of said interior wall spaced from said first portion and along said first length between said inner apex surface of said tip portion of said distal end and said proximal end; wherein said electrical wire has a proximal end, a distal end, and a length therebetween, and is adapted to heat up evenly along the entire of said length; and wherein said electrical wire is adapted to conduct heat evenly to and along the entire of said second length of said elongated hollow body and thereby said external heating surface of said exterior wall of said elongated heating rod.

5. The electric skewer of claim 4, wherein said electrical wire is formed from a material chosen from a list of materials consisting of copper, aluminum, gold, platinum, silver, zinc, nickel, iron, steel, bronze, and brass.

6. The electric skewer of claim 1, wherein said elongated hollow body is formed from a material chosen from a list of materials consisting of metal and ceramic.

7. The electric skewer of claim 1, wherein said tip portion of said distal end is formed having a cone-shape adapted to pierce said material to be heated.

8. The electric skewer of claim 1, wherein said power source includes an elongated electric cord adapted to releasably plug into an external power source; and wherein said handle includes an aperture therethrough adapted to allow said elongated electric cord to pass therethrough and between said external power source and said elongated conductor of said elongated heating element.

9. The electric skewer of claim 1, wherein said handle formed from an insulating material adapted to resist transfer of said heat from said elongated heating rod to said handle.

10. The electric skewer of claim 1, wherein said electrical power source is formed as a rechargeable battery member.

11. The electric skewer of claim 1, wherein said handle includes a power controller attached thereto and electrically connected between said electrical power source and said elongated conductor, and adapted to control the amount of power delivered to said elongated conductor and thereby the desired temperature of said elongated conductor.

12. A combined apparatus of a cooking apparatus and at least one electric skewer, said combined apparatus comprising:
a cooking apparatus including:
a main body including:
a bottom wall;
at least one side wall;
wherein said at least one side wall is attached to and extends from said bottom wall and defines an interior volume;
a cooking platform;
wherein said cooking platform is releasably connected to said at least one side wall within said interior volume and is adapted to hold material thereon to be heated by said cooking apparatus;
an electric heating element;
wherein said electric heating element is located within said interior volume and between said bottom wall and said cooking platform; and
wherein said electric heating element is adapted to heat said material placed upon said cooking platform;
an electrical power source;
wherein said electrical power source is electrically connected to and supplies electric power to said electric heating element; and
at least one skewer power outlet;
wherein each of said at least one skewer power outlet is connected to said at least one side wall of said main body, is electrically connected to said electrical power source, and is adapted to supply said electric power to at least one electric skewer; and
said at least one electric skewer comprising:
an elongated heating rod including:
an elongated hollow body including:
a proximal end including an aperture therethrough;
a distal end including:
a tip portion including:
an inner apex surface; and
an outer apex surface;
an interior wall including an interior surface forming a hollow interior volume between said proximal end and said inner apex surface of said tip portion of said distal end;
an exterior wall defining an exterior shape between said proximal end and said outer apex surface of said tip portion of said distal end, and forming an external heating surface upon the entire said exterior wall;
a first length along said interior wall between said proximal end and said inner apex surface of said tip portion of said distal end;
a second length between said proximal end and said outer apex surface of said tip portion of said distal end along said exterior wall;
an elongated heating element including:
an elongated conductor;
wherein said elongated conductor is located within said hollow interior volume of said elongated hollow body and contacts said interior wall of said elongated hollow body along said first length to thereby conduct heat evenly to the entire said external heating surface of said exterior wall;
wherein said elongated heating rod is adapted to be heated evenly along said second length; and
wherein said elongated heating rod is adapted to be pushed into and pulled out from said material to be heated;
a handle;
wherein said handle is connected to said proximal end of said elongated hollow body of said elongated heating rod, and is adapted to allow a person to hold said elongated heating rod while being pushed into and pulled out from said material to be heated; and
wherein said handle is formed from a material adapted to resist said heat from said elongated heating rod from transferring therethrough; and
an electrical power cord;
wherein said electrical power cord is adapted to releasably connect with and transfer said electric power from said at least one skewer power outlet of said cooking apparatus; and
wherein said electrical power cord is electrically connected to and supplies said electric power to said elongated conductor of said elongated heating element;
wherein said at least one electric skewer is adapted to be pushed into said material to be heated and heat said material from its inside outward while said material is being heated by said cooking apparatus from its outside inward, to thereby more efficiently heat said material throughout said material and to make sure that all portions of said material is heated to a desired temperature.

13. The combined apparatus of claim 12, wherein said elongated conductor is formed as an electrical conducting tube located within said hollow interior volume of said elongated hollow body and contact the entire of said interior surface of said interior wall, and adapted to conduct heat evenly to the entire said external heating surface of said exterior wall.

14. The combined apparatus of claim 13, wherein said electrical conducting tube is formed from a material chosen from a list of materials consisting of copper, aluminum, gold, platinum, silver, zinc, nickel, iron, steel, bronze, and brass.

15. The combined apparatus of claim 12, wherein said elongated conductor is formed as an electrical wire extending along and contacting a first portion of said interior surface of said interior wall along said first length between said proximal end and said inner apex surface of said tip portion of said distal end, and then continuing and extending along and contacting a second portion of said interior surface of said interior wall spaced from said first portion and along said first length between said inner apex surface of said tip portion of said distal end and said proximal end; wherein said electrical wire has a proximal end, a distal end, and a length therebetween, and is adapted to heat up evenly along the entire of said length; and wherein said electrical wire is adapted to conduct heat evenly to and along the entire of said second length of said elongated hollow body and thereby said external heating surface of said exterior wall of said elongated heating rod.

16. The combined apparatus of claim 15, wherein said electrical wire is formed from a material chosen from a list of materials consisting of copper, aluminum, gold, platinum, silver, zinc, nickel, iron, steel, bronze, and brass.

17. The combined apparatus of claim 12, wherein said elongated hollow body is formed from a material chosen from a list of materials consisting of metal and ceramic.

18. The combined apparatus of claim 12, wherein said tip portion of said distal end is formed having a cone-shape adapted to pierce said material to be heated.

19. The combined apparatus of claim 12, wherein said electrical power source of said cooking apparatus includes an elongated electric cord adapted to releasably plug into an external power source and transfer said electric power to said electric heating element of said cooking apparatus and said at least one skewer power outlet.

20. The combined apparatus of claim 12, wherein said handle formed from an insulating material adapted to resist transfer of said heat from said elongated heating rod to said handle.

21. The combined apparatus of claim 12, wherein said electrical power source of said cooking apparatus is formed as a rechargeable battery member.

22. The combined apparatus of claim 12, wherein said handle includes a power controller attached thereto and electrically connected between said power source and said elongated conductor, and adapted to control an amount of said electric power delivered to said elongated conductor and thereby the desired temperature of said elongated conductor.

23. The combined apparatus of claim 12, further comprising a protective cover for each of said at least one electric skewer; wherein said protective cover is formed including an insulating material adapted to resist the transfer of said heat from said at least one electric skewer through said protective cover to thereby protect a person when handling said at least one electric skewer after use.

24. The combined apparatus of claim 12, wherein said cooking apparatus further includes a cover member adapted to releasably cover said main body and releasably enclose said interior volume of said main body when heating said material.

25. The combined apparatus of claim 12, wherein said cooking platform is formed as a grating.

26. The combined apparatus of claim 12, wherein there are a plurality of skewer power outlets spaced from one another and connected to said at least one side wall of said main body, are respectively electrically connected to said electrical power source, and are adapted to supply said electric power to a plurality of electric skewers.

27. The combined apparatus of claim 26, wherein there are a plurality of electric skewers each adapted to releasably connect with a respective one of said plurality of skewer power outlets, wherein said plurality of electric skewers can be used at a same time and are adapted to be used to heat a plurality of materials at the same time within said interior volume of said main body of said cooking apparatus.

\* \* \* \* \*